Feb. 5, 1957  J. H. AMMON  2,780,272
TUBULAR BALL DRIFT TUBE EXPANDER
Filed Nov. 12, 1954
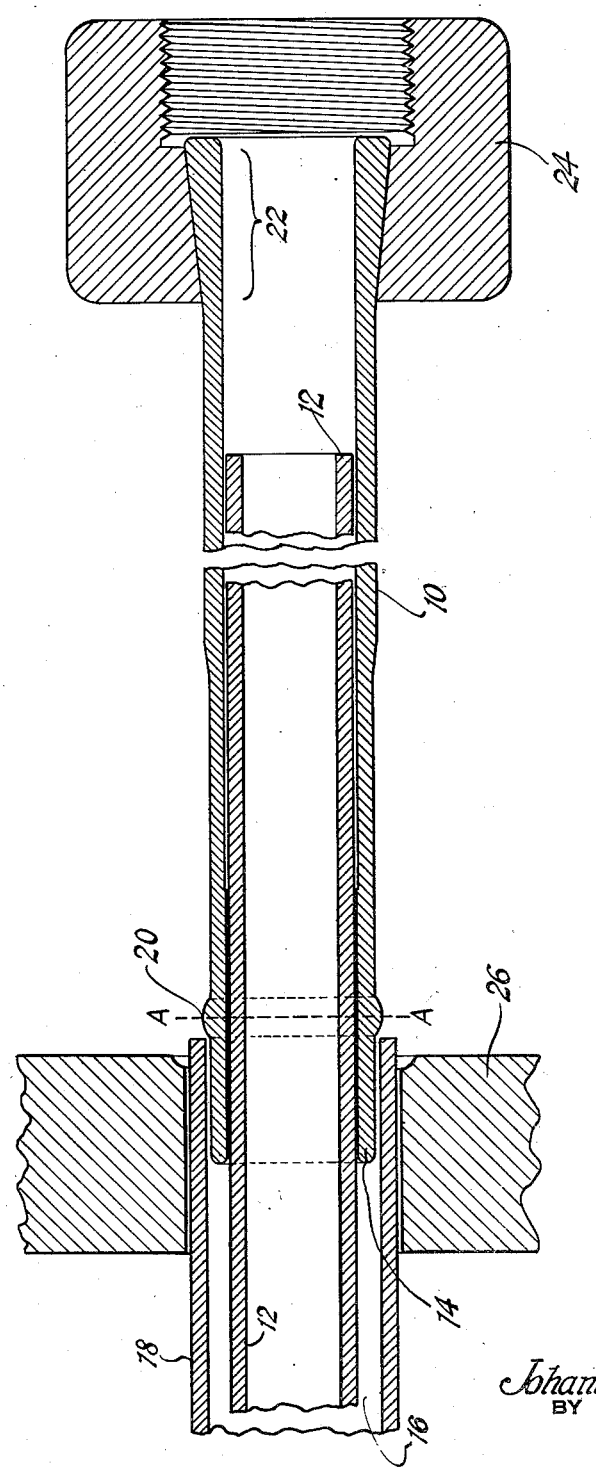
INVENTOR
Johannes H. Ammon
BY
M. Holbrook
ATTORNEY

United States Patent Office 2,780,272
Patented Feb. 5, 1957

2,780,272
TUBULAR BALL DRIFT TUBE EXPANDER

Johannes H. Ammon, Barberton, Ohio, assignor to The Babcock & Wilcox Company, New York, N. Y., a corporation of New Jersey Application November 12, 1954, Serial No. 468,327

1 Claim. (Cl. 153—80.5)

This invention relates to tube expanders adapted to expand a tube against the wall of a tube seat in order to make a pressure tight connection for high pressure heat exchangers. More particularly, the invention relates to a hollow ball drift expander of tubular construction adapted operate in the annular space between an inner tube and an outer tube of a double tube heat exchanger. This heat exchanger is of such a type that it is necessary for the inner tube to be disposed within the outer tube before the latter is expanded to form a pressure tight connection between the outer tube and the co-acting tube sheet.

The invention involves a ball drift expander for tube expanding action in the annular space between a fixed tube and a concentric and fixed inner tube with one end portion of the inner tube projecting axially a substantial distance beyond the corresponding end portion of the outer tube which latter portion is to be expanded the ball drift expander. The ball drift expander of the invention, specifically, includes a hollow tubular metallic body having a single circular exterior rib adjacent one end of the body, said rib being formed as a spherical segment with an outwardly convex surface, the outside diameter of the rib being greater than the outside diameter of the major part of the length of the tubular body and the segmental spherical surface of the rib being symmetrical about its median plane normal to the long axis of the tubular body, the portion of the tubular body opposite the rib end being spaced from said rib a distance greater than the length of the axially projected portion of said inner tube by a length at least equal to the distance travelled by said drift while expanding the end portion of said outer tube, and having increasing wall thickness to afford a drive end portion capable of absorbing heavy impacts to move the expander in the annular space between said inner tube and the end portion of said outer tube, the latter of which is to be expanded by that movement.

The ball drift expander incorporating the invention involves a tubular body having an external annular rib spaced from the end of the tubular body which is adapted to be inserted in the tubular annulus. This rib is constructed as a spherical segment and it is preferably hard chrome plated to a thickness of .0025" to prevent damage to the tube to be expanded and to assure a smooth expanding operation. The bore of the tubular body of the expander is of such diameter that the expander may move freely in telescopic relation to the inner tube. The hollow tubular body of the expander is of such length that it projects beyond the end of the inner tube where the tubular body is formed with a tapered drive end of increased thickness to withstand the heavy impact of an air hammer adapted to operate the expander. The anvil nut of the air hammer closely fits the tapered drive end of the hollow body.

The illustrative hollow ball drift expander will be concisely set forth in the attached claim, but for a more complete understanding of the operation of the expander, its uses and advantages, recourse should be had to the following description, which refers to the pertinent drawing.

The drawing is a longitudinal section disclosing the hollow ball drift expander about to operatively engage the outer tube of a double tube high pressure heat exchanger in which the outer tube is to be expanded against the wall of a tube seat to form a pressure tight connection between the outer tube and the tube sheet or pressure vessel wall in which the tube seat is formed. The pertinent pressure vessel is of a type in which there must be an inner tube disposed within the outer tube and projecting beyond the end of the outer tube, before the outer tube is expanded.

The hollow ball drift expander has a tubular body 10, preferably made of carbon tool steel tubing with an inside diameter slightly larger than the outside diameter of the inner tube 12 of the heat exchanger. The front end portion 14 is preferably tapered conically to facilitate entry into the annulus 16 between the outer tube 18 and the inner tube 12. Adjoining the tapered end portion is a convex rib 20 in the form of a spherical segment, preferably hard chrome plated to a thickness of .0025" to insure a smooth tube expanding operation and to prevent damage to the inside surface of the tube to be expanded.

The spherical segment of rib 20 is preferably symmetrical about a plane indicated by A—A in the drawing. This plane may be referred to as a median plane normal to the long axis of the body 10.

The drive end portion 22 of the ball drift expander is tapered so as to form a shank of increasing mass at the end of the expander which absorbs the heavy impact of a pneumatic hammer. The anvil nut 24 secures the ball drift expander to the hammer in such a way that reverse hammering may be effected for withdrawal of the ball drift after the outer tube has been expanded, as well as for the forward hammering of the ball drift expander during its tube expanding action. The anvil nut 24 has a conical inner surface closely fitting the outside taper of the hollow body of the ball drift expander as clearly indicated in the drawing.

The drawing also shows the section of a pressure vessel wall 26 which acts as a tube sheet, having an opening formed therein to receive the outside tube 18, the wall of this opening constituting the tube seat for the tube 18.

Although the invention has been described with reference to the preferred embodiment thereof, it is to be appreciated that the invention is not limited to all of the details of that embodiment. The invention is rather to be taken as of a scope commensurate with the scope of the subjoined claim.

What is claimed is:

In a ball drift expander for tube expanding action in the annular space between a fixed outer tube and a concentric and fixed inner tube with one end portion of the inner tube projecting axially a substantial distance beyond the corresponding end portion of the outer tube which latter portion is to be expanded by the ball drift, a hollow tubular metallic body having a single circuit exterior rib adjacent one end of the body, said rib being formed as a spherical segment with an outwardly convex surface, the outside diameter of the rib being greater than the outside diameter of the major part of the length of the tubular body and the segmental spherical surface of the rib being symmetrical about its median plane normal to the long axis of the tubular body, the end of the tubular body opposite the rib end being spaced from said rib a distance greater than the length of the axially projected portion of said inner tube by a length at least equal to the distance travelled by said drift while expanding the end portion of said outer tube, and having an increasing wall thickness to afford a drive end portion capable of absorbing heavy impacts to move the expander in the annular space between said inner tube and the end portion of said outer tube, the latter of which is to be expanded by that movement.

References Cited in the file of this patent

UNITED STATES PATENTS

| | | |
|---|---|---|
| 2,357,123 | Maxwell | Aug. 29, 1944 |
| 2,493,127 | Franck | Jan. 3, 1950 |
| 2,707,511 | Franck | May 3, 1955 |

FOREIGN PATENTS

| | | |
|---|---|---|
| 94,059 | Switzerland | Apr. 17, 1922 |

OTHER REFERENCES

Pages 85, 86 and 87 of the March 10, 1949 issue of the American Machinist.